Figure 1:
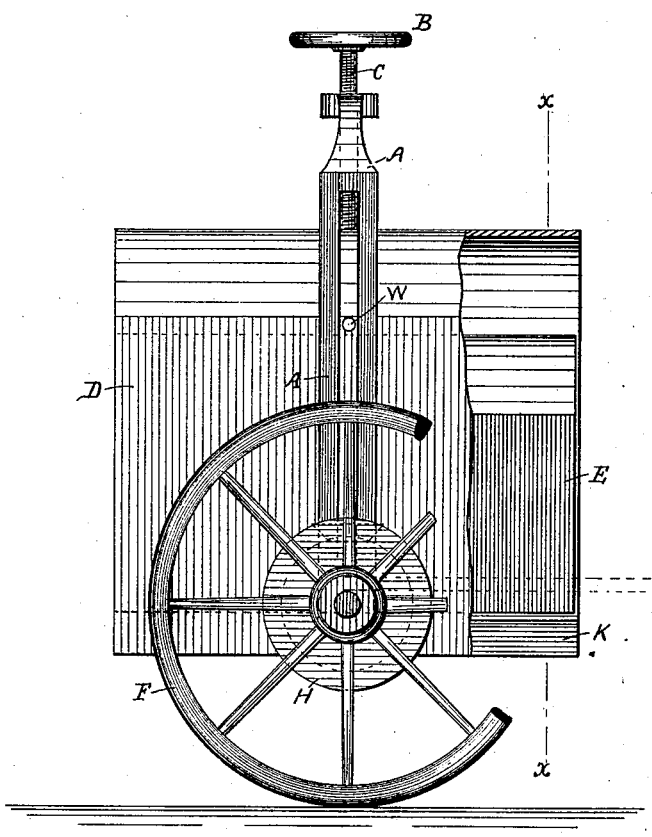

(No Model.) 2 Sheets—Sheet 1.

F. D. CASEY.
POTATO BUG CATCHING MACHINE.

No. 254,459. Patented Mar. 7, 1882.

WITNESSES
A. B. Robertson
G. S. Perrie

INVENTOR
F. D. Casey
BY Frost & Coe,
Attorneys

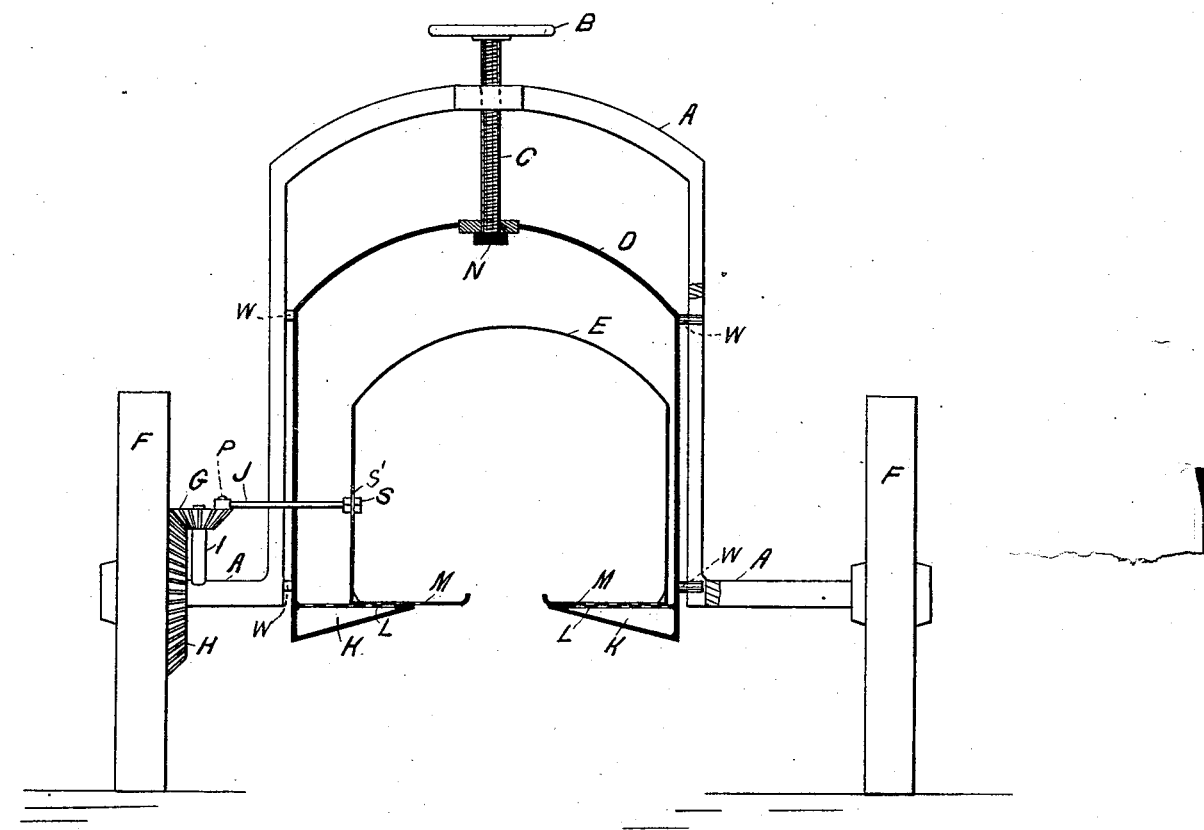

UNITED STATES PATENT OFFICE.

FREDERICK D. CASEY, OF WEST DEER PARK, NEW YORK.

POTATO-BUG-CATCHING MACHINE.

SPECIFICATION forming part of Letters Patent No. 254,459, dated March 7, 1882.

Application filed April 19, 1881. (No model.)

*To all whom it may concern:*

Be it known that I, FREDERICK D. CASEY, a citizen of the United States, residing at West Deer Park, in the county of Suffolk and State of New York, have invented a new and useful Improvement in Machines for Removing Bugs from Potato-Vines, of which the following, taken in connection with the accompanying drawings, is a full, clear, and accurate description.

Figure 1 represents a side view of my invention, partly broken away at one side; and Fig. 2 is a vertical section of the same through the line $x\ x$.

My improvement is made as follows:

A is the axle of the machine, bent as shown in the drawings, and joined to the wheels F.

Suspended from the axle A by means of the screw C, and resting on the lug N, is the frame D. This screw C, worked by the lever or handle B, raises or lowers the frame D at pleasure. This frame D slides vertically between the lateral arms of the axle A, and is held in position by the lugs W.

At the bottom of frame D are attached two pans, K, preferably triangular in shape, one on each side. Within the frame D, and resting over the pans K, is a sliding frame, E, the bottom of which is formed into two shakers, M, which slide upon the perforated plates L, covering the pans K. The perforated plates L of the pans K prevent the escape of bugs from said pans when the shaker is moved to either side or removed, and also serve to support the shakers.

To one of the wheels F of the machine is attached a beveled vertical cog-wheel, H, which engages with a smaller horizontal cog-wheel, G, supported on the upright arm I, attached to the axle A.

To the cog-wheel G is attached by pin P one end of the arm or piston J, which passes through slots in the vertical arm of axle A and frame D, and is attached at its other end by clamp S to frame E. The clamp S is so constructed as to slide in a slot, S', to permit the frame E to slide up and down without moving the rod or lever J.

The operation of my improvement is as follows: The motion of the wheels F imparts motion by means of the arm J, operated by the cog-wheels H and G, to the sliding frame E, and causes the said frame to move to and fro. As the machine, worked either by hand or horse power, is drawn along over the row of potato-vines the stems of the vines pass between the pans K and shakers M, the leaves of the vines overhanging both. When the vines are in such a position the rapid vibrations of the shakers M, caused by the movement of the frame E to and fro, will knock off any bugs that may be on the vines and cause them to fall upon the perforated plate L, and thence into the pans K, from which they may be removed and killed.

This machine may also be adapted and used to shake off the worms from cotton or other plants.

Having thus described my invention, what I claim, and desire to secure by Letters Patent, is—

1. The frame D, mounted on wheels, as described, and provided with the pans K and the perforated plates L, substantially as and for the purpose specified.

2. The frame D, provided with the pans K, in combination with the sliding frame E, shakers M, and means, substantially as described, for giving said shakers a reciprocating movement, as and for the purpose specified.

3. The frame D, pans K, and perforated plates L, in combination with the perforated shakers M, and means, substantially as described, for giving said shakers a reciprocating movement, as and for the purpose specified.

4. The axle A, provided with a screw, C, in combination with the frame D, the pans K, and the reciprocating shakers M, as and for the purpose specified.

5. In combination with the axle A, the frame D, provided with pins W moving between the lateral arms of said axle, and with pans K, the frame E, carrying the reciprocating shakers M, and the screw C, substantially as and for the purpose specified.

6. The axle A, supporting the vertically-adjustable frame D and pans K, in combination with the shakers M, the frame E, provided with the slot S', the rod J, gearing G H, and the wheel F, as and for the purpose specified.

In testimony whereof I have hereunto set my hand this 14th day of April, 1881.

F. DENT CASEY.

In presence of—
CHARLES G. COE,
R. THEM. BOSKERCK.